W. H. KEMPTON.
PROCESS OF FORMING LAMINATED TUBES.
APPLICATION FILED JAN. 5, 1915. RENEWED OCT. 2, 1918.
1,284,706.
Patented Nov. 12, 1918.
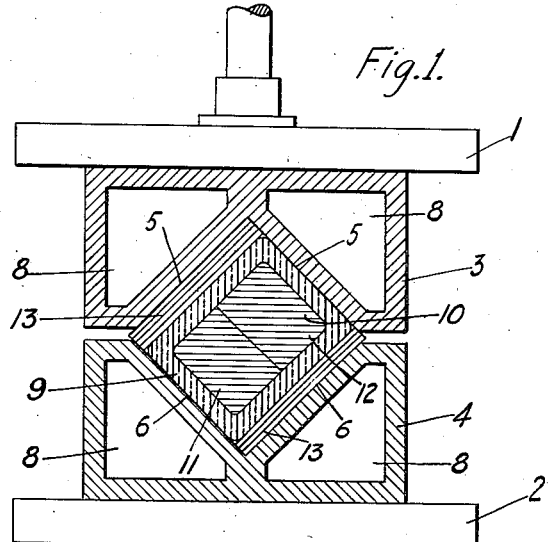
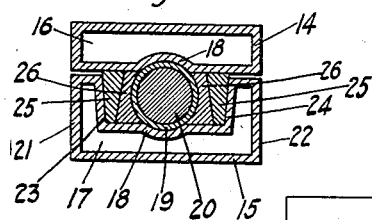
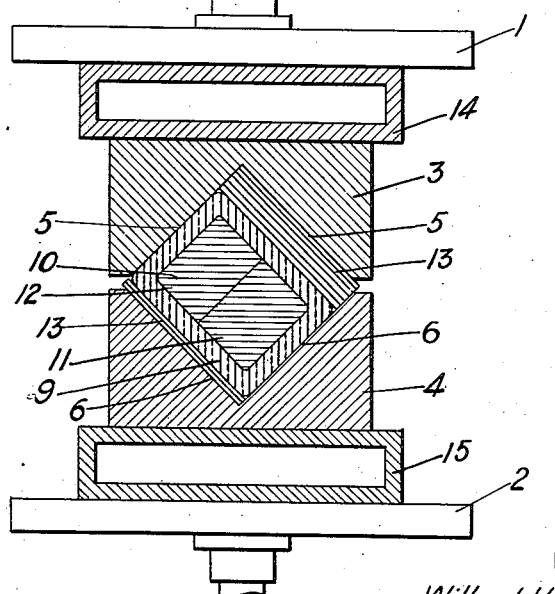
WITNESSES:
Chas. Fornander
R. D. Brown
INVENTOR
Willard H. Kempton.
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF FORMING LAMINATED TUBES.

1,284,706.   Specification of Letters Patent.   Patented Nov. 12, 1918.

Application filed January 5, 1915, Serial No. 611. Renewed October 2, 1918. Serial No. 256,625.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Processes of Forming Laminated Tubes, of which the following is a specification.

My invention relates to a process of manufacturing insulating tubes from absorbent sheet material, combined, in layers, with a phenolic condensation product, such as bakelite or condensite, or with some other adhesive substance which is adapted to be hardened by the influence of heat and pressure.

By means of my process, it is possible to produce, in a simple, rapid and effective manner, tubes of high insulating quality having uniformly compact walls of which the laminated quality has practically disappeared, the combination being merged into an integral and homogeneous substance. This process is, moreover, carried out with simple and efficient apparatus and with a minimum of labor.

In the electric arts, much use is made of tubes formed by winding upon a mandrel a web of paper or other absorbent material that has been treated with a phenolic condensation product or some other adhesive substance which may be hardened by the application of heat and pressure. When cylindrical tubes are required, they are completed by subjecting them, while upon the mandrel, to the simultaneous action of pressure and heat. On account of the simultaneous application of both heat and considerable pressure during the winding operation, this process has been very slow, laborious and costly, and the tubes have, to a considerable degree, retained their laminated quality, their structure not being as compact, as desirable nor of an integral or homogeneous character. When tubes of rectangular or of some other non-circular cross-section are desired, it has heretofore been usual to remove them from the mandrels before they have been heated sufficiently to harden the adhesive material, so that they will readily soften when heated again. The resulting tubes have then been cut into proper lengths, heated until they become soft, and slipped over mandrels of the required rectangular or other shape. The mandrels and tubes have then been placed in a heated chamber and maintained under superatmospheric pressure for the purpose of hardening the adhesive material and thus giving the tubes their final form. In spite of the high air pressure maintained in the heating chamber, the sides of the tubes have often been blistered and split apart, and even when the sides of the tubes do not split or blister, their walls are much less compact and coherent than those of tubes finished upon cylindrical mandrels. This results from the fact that, when tubes are heated upon cylindrical mandrels under pressure, there is equal pressure toward the center on all sides of the tubes, while, when tubes are heated upon angular mandrels, the pressure at the corners is much greater than the pressure upon the flat sides.

According to my present invention, I modify the process just described by placing the mandrel carrying a softened tube in a special press equipped with a pair of heated platens. If angular tubes are required, each of the platens is provided with angularly related work-engaging surfaces which include between them a space equal in size and shape to the outside contour of the finished tubes. The platens are brought together to compress the mandrel and the tube tightly between them, and the form of the platens is such that pressure is brought to bear upon all sides of the tubes at once. Heat is then applied to the platens and a high temperature is maintained until the adhesive material of the tube is thoroughly hardened. Thus, substantially uniform pressure and heat are applied to all points on the surface of the tube while it is supported throughout its entire area by means of the mandrel. The heat is then interrupted and the platens are preferably supplied with cooling fluid in order to cool the tube and mandrel, after which the finished tube is removed from the mandrel.

In the accompanying drawing, I have not considered it necessary to show the winding process, as the winding under compression may be carried out in any convenient and rapid manner. With respect to the clamping or molding operation, I show, in Figure 1, a side view, partly in elevation and partly in section, of a press adapted for use in practising my process in making square or rectangular tubes. Fig. 2 is a side view, similar to Fig. 1, showing a press having a modified form of platen structure, and Fig. 3 is a transverse sectional view of a pair of platens adapted to form cylindrical tubes.

In Fig. 1, a pair of coöperating pressure members 1 and 2 are adapted to be moved toward and from each other by convenient mechanism. Disposed between the pressure members 1 and 2 are a pair of coöperating platens 3 and 4 which are designed to form rectangular tubes. The platen 3 is provided with work-engaging surfaces 5, which, as shown, are perpendicular to each other but which may have any other angular relation in accordance with the form to be given to the tubes. The platen 4 is similarly provided with angularly related work-engaging surfaces 6 and both of the platens have interior passages 8 through which steam or water may be circulated to heat or cool the platens. A tube 9 is shown in position to be compressed between the platens 3 and 4, the tube being held upon a mandrel 10 which, as shown, is composed of two separable portions 11 and 12. The mandrel may be of any suitable material and may be composed of one or more sections, but it is preferably made collapsible in order to facilitate ready removal from the finished tube. In order to accommodate rectangular tubes of different sizes and different proportions, spacing plates 13 are provided, and these plates may be varied in number and length in accordance with the required shape of the tube.

The structure shown in Fig. 2 differs from that shown in Fig. 1 in that the platens 3 and 4 are not provided with self-contained heating means, but are inclosed between upper and lower hollow plates 14 and 15, through which heating and cooling fluids may be circulated.

In the application of my invention to the manufacture of cylindrical tubes, a pressure device like or similar to that shown in Fig. 3 may be used. This pressure device includes coöperating platens 14 and 15 provided with interior spaces 16 and 17 for admitting heating and cooling fluids and with curved depressions 18 which correspond, in curvature, to a tube 19 that is held on a mandrel 20. The platen 15 is also provided with upturned sides 21 and 22 having inclined sides 23 and 24 directed toward the tube 19. Spacing or wedging members 25 and 26 are adapted to be received in the spaces between the inclined sides 23 and 24 and the tube 19, and, as shown, these wedges are of such shape that, when the platens 14 and 15 are forced toward each other, lateral pressures will be transmitted to the tube, such lateral pressures being substantially equal to the pressures exerted on the parts of the tube that are in contact with the curved depressions 18 in the platens.

In practising my process with the apparatus shown and described, the mandrel and tube, prepared in the manner described above, are placed between the platens, a suitable number of spacing plates 13 or 25 and 26 of the proper size being introduced between the tube and one or more of the platens in order that all sides of the tubes may be tightly compressed when the platens are moved together. Pressure is then applied and the platens are heated sufficiently to effect softening and then hardening of the insulating adhesive substance, which may be done by introducing steam into the internal passages of the platens or through the hollow plates 14 or 15, if the structure shown in Fig. 2 is employed. When the hardening process is finished, the steam is turned off and water may be applied to the platens until the tube and mandrel are cooled, when they may be removed from the press and the tube slipped from the mandrel.

The pressures developed in my process are much greater than the air pressures obtainable in the pressure devices heretofore in use for similar purposes, and the strength and compactness of the finished articles are correspondingly increased, as well as the rapidity with which the pressing operation is performed. The steps of my process and the structural details of the apparatus which I have described may be variously modified by persons skilled in the art without departing from the spirit of my invention, and it is therefore to be understood that my invention comprehends all such modifications as fall within the scope of the appended claims.

I claim as my invention:

1. A process of forming angular tubes that comprises winding upon a mandrel a web of absorbent sheet material treated with an adhesive substance that is adapted to harden under the influence of heat and pressure, heating the wound material sufficiently to soften the said adhesive substance, and applying heated surfaces under high pressure to the said material to form the sides of the required angular tube and to harden the said adhesive substance.

2. A process of forming angular tubes that comprises winding upon a mandrel a web of absorbent material treated with an adhesive substance that is adapted to harden under the influence of heat and pressure, removing the wound material from the said mandrel, heating the resulting tube upon a mandrel of the desired angular form, and applying heated surfaces to the sides of the said formed tube to harden the said adhesive substance.

3. A process of forming angular tubes that comprises winding upon a mandrel a web of absorbent sheet material treated with a phenolic condensation product, heating the wound material sufficiently to soften the said adhesive substance and applying heated surfaces under high pressure to the said material to form the sides of the required angular tube and to harden the said adhesive substance.

4. A process of forming angular tubes that comprises winding upon a mandrel a web of absorbent material treated with a phenolic condensation product, removing the wound material from the said mandrel, heating the resulting tube sufficiently to soften the said adhesive substance, placing the said tube upon a mandrel of the desired angular form, and applying heated surfaces to the sides of the said formed tube to harden the said condensation product, and finally cooling the said surfaces.

5. The herein-described method of making tubing from sheet material, which consists in winding into a tube a fabric bearing an adhesive, internally supporting the tube throughout its entire internal area, applying a substantially uniform heat to the wound tube at all points, and applying externally an approximately uniform mechanical pressure at every point on its external surface for uniformly compressing the wall of the tube.

In testimony whereof, I have hereunto subscribed my name this 29th day of Dec., 1914.

WILLARD H. KEMPTON.

Witnesses:
GOLDIE E. McGEE,
B. B. HINES.